(12) United States Patent
Smedley et al.

(10) Patent No.: US 9,929,667 B2
(45) Date of Patent: *Mar. 27, 2018

(54) CIRCUIT FOR DIRECT ENERGY EXTRACTION FROM A CHARGED-PARTICLE BEAM

(71) Applicant: THE REGENTS OF THE UNIVERSITY OF CALIFORNIA, Oakland, CA (US)

(72) Inventors: Keyue Smedley, Aliso Viejo, CA (US); Frank J. Wessel, Irvine, CA (US); Mingying Gu, Aliso Viejo, CA (US); In Wha Jeong, Irvine, CA (US)

(73) Assignee: THE REGENTS OF THE UNIVERSITY OF THE CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,256

(22) Filed: Apr. 13, 2016

(65) Prior Publication Data

US 2017/0025967 A1   Jan. 26, 2017

Related U.S. Application Data

(63) Continuation of application No. 13/001,589, filed as application No. PCT/US2009/049108 on Jun. 29, 2009, now Pat. No. 9,343,189.

(Continued)

(51) Int. Cl.
*H02M 5/45* (2006.01)
*H02M 5/458* (2006.01)

(Continued)

(52) U.S. Cl.
CPC ............. *H02M 5/458* (2013.01); *G21D 7/00* (2013.01); *H02J 3/38* (2013.01); *H02M 1/36* (2013.01);

(Continued)

(58) Field of Classification Search
CPC ...................................... H02M 5/458
See application file for complete search history.

(56) References Cited

U.S. PATENT DOCUMENTS 4,641,060 A   2/1987 Dandl
5,903,452 A   5/1999 Yang
(Continued)

FOREIGN PATENT DOCUMENTS

CN       201018416 Y   2/2008
WO   WO 2006/096772   9/2006

OTHER PUBLICATIONS

CN, 200980128404.6 First Office Action, dated Apr. 27, 2013.
(Continued)

*Primary Examiner* — Jue Zhang
*Assistant Examiner* — Trinh Q Dang
(74) *Attorney, Agent, or Firm* — ONE LLP

(57) ABSTRACT

Provided herein is a fusion energy extraction circuit (FEEC) device having a grid-tied bidirectional converter and a resonant converter. The resonant converter can include an inverse cyclotron converter with two or more or quadruple plates and a plurality of circuit switches. The bidirectional converter can include a three-phase grid-tied converter. The FEEC device is capable of decelerating plasma particle beams, thereby extracting the energy from the deceleration, converting the extracted energy to electric energy, and sending the electric energy to a power grid.

14 Claims, 8 Drawing Sheets

Related U.S. Application Data

(60) Provisional application No. 61/076,535, filed on Jun. 27, 2008.

(51) Int. Cl.
    *H02M 5/46* (2006.01)
    *G21D 7/00* (2006.01)
    *H02J 3/38* (2006.01)
    *H05H 15/00* (2006.01)
    *H02M 1/36* (2007.01)
    *H02M 1/42* (2007.01)

(52) U.S. Cl.
    CPC ........... *H02M 1/4241* (2013.01); *H02M 5/45* (2013.01); *H02M 5/4585* (2013.01); *H02M 5/46* (2013.01); *H05H 15/00* (2013.01); *Y02B 70/145* (2013.01)

(56) References Cited

U.S. PATENT DOCUMENTS

| | | |
|---|---|---|
| 6,611,106 B2 | 8/2003 | Monkhurst et al. |
| 6,852,942 B2 | 2/2005 | Monkhorst et al. |
| 2002/0024828 A1* | 2/2002 | Hayashi ............ H02M 5/4505 363/35 |
| 2002/0060527 A1 | 5/2002 | Matsumoto et al. |
| 2005/0254265 A1 | 11/2005 | Yamada |
| 2006/0103341 A1 | 5/2006 | Steigerwald et al. |
| 2006/0214513 A1 | 9/2006 | Tan et al. |
| 2006/0238148 A1* | 10/2006 | Correa ............ H02P 31/00 318/114 |
| 2008/0094860 A1 | 4/2008 | Falk |
| 2008/0128641 A1 | 6/2008 | Henley et al. |
| 2008/0157598 A1* | 7/2008 | Kuitani ............ H02J 3/1814 307/45 |

OTHER PUBLICATIONS

KR, 10-2011-7001802 Office Action, dated Mar. 27, 2013.
SG, 201009576-8 Examination Report, dated Feb. 3, 2012.
WO, PCT/US2009/0419109 ISR, dated Feb. 1, 2010.
WO, PCT/US2009/0419109 IPRP, dated Jan. 5, 2011.

* cited by examiner

CIRCUIT FOR DIRECT ENERGY EXTRACTION FROM A CHARGED-PARTICLE BEAM

CROSS-REFERENCE TO RELATED APPLICATIONS

This application is a continuation of U.S. application Ser. No. 13/001,589, filed Apr. 15, 2011, which is a national stage entry of PCT Application No. PCT/US2009/049108, filed Jun. 29, 2009, which claims the benefit of U.S. Provisional Application No. 61/076,535, filed Jun. 27, 2008, the disclosures of all of which are fully incorporated herein by reference.

FIELD OF THE INVENTION

The invention relates generally to electric circuits and, more particularly, to an electric circuit that facilitates the extraction of energy from charged particles as a result of a controlled fusion reaction and sends the energy to the power grid with a unity power factor, leading power factor, or lagging power factor on demand.

BACKGROUND OF THE INVENTION

Controlled fusion power generation will open the door to abundant and clean energy sources. This topic has attracted significant research efforts in the United States and the world. The reported approaches are typically based on conversion of fusion energy to thermal energy then to electric energy.

In an alternative approach described in U.S. Pat. No. 6,611,106 (the '106 patent), entitled "Controlled fusion in a field reversed configuration and direct energy conversion," which is incorporated herein by reference, controlled fusion energy, carried by charged particle beams in the form of momentum, can be converted directly to electricity by decelerating the charged particles using a quadrupole inverse cyclotron converter (ICC). Thus, higher energy conversion is expected. A key technology is needed that extracts the energy from the ICC and injects it to the utility grid.

Accordingly, it would be desirable to provide a power electronic circuit used to decelerate the plasma particles, extract the energy from the deceleration action, convert the plasma energy directly to electric energy and send the electricity to the power grid.

SUMMARY

The exemplary embodiments of a fusion energy extraction circuit (FEEC) device described herein represent only a few examples of the many possible implementations of the FEEC device and are in no way intended to limit the subject matter of the present description.

In one embodiment, the FEEC device preferably comprises a grid-tied bidirectional converter component and a resonant converter component. The bidirectional converter component can implement leading phase, lagging phase, or unity power factor grid-tied converters for different purposes.

The resonant converter preferably comprises an inverse cyclotron converter (ICC), an inductor, and a plurality of circuit switches forming a bridge that chops the dc voltage to a pulse waveform. The ICC is preferably configured with two or more or quadrupole plates that function as a capacitor together with an inductor to act as a resonant tank. The plates are preferably elongate with an arcuate cross-section forming an elongate annular cylindrical chamber with axially extending elongate gaps formed between the plates.

During start up of the FEEC device, energy flows from the utility grid via the grid-tied bidirectional converter component to the resonant converter. This establishes the resonance and excites the quadrupole electric field formed across the gaps between the plates. During power generation or energy extraction, charged particles of charge particle beams from, e.g., a fusion process are decelerated by the quadrupole electric field as the particle beams travel through the ICC. Also during power generation, lost energy will be collected by the quadrupole plates of the ICC in the form of an image current. The image current will then flow through the resonant converter and the grid-tied bidirectional converter component to the utility grid.

The grid-tied converter functions as an ac/dc rectifier during start up time and as a dc/ac grid-tied inverter during power generation. In both cases, the grid-tied converter will operate with unity power factor, leading power factor, or lagging power factor to provide active power and reactive power (VAR) on demand.

To realize electric field excitation and energy extraction, the resonant frequency and voltage of the resonant converter are preferably precisely controlled. The frequency in this case is fixed at slightly above the resonant frequency of the resonant tank, while the voltage control can be achieved by switching pattern modulation and feedback regulation. Two modulation methods, phase shift modulation (PSM) and pulse-width modulation (PWM), are capable of providing voltage control. Feedback regulation is achieved by comparing the sensed resonant voltage with a reference, while its error is used to modulate the phase or the pulse-width of the switches in the resonant converter. With this modulation, automatic bidirectional energy flow according to the operation mode is guaranteed.

In an alternative embodiment of FEEC device, resonant conductor can implement multiple ferrite inductors connected in series to optimize the FEEC device operation. The series-connected resonant inductors have several advantages over a single resonant inductor.

Feedback regulation is achieved by comparing the sensed resonant voltage with a reference, while its error is used to modulate the phase or the pulse-width of the plurality of switches in the resonant converter.

In another exemplary embodiment, a feedback control loop of the resonant converter can be utilized to facilitate automatic bidirectional power flow. The feedback control loop is composed of a resonant voltage sensing circuit, an error compensator, and a PWM or PSM pulse generator.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. As mentioned above, it is also intended that the invention not be limited to the details of the example embodiments.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The systems and methods described herein are directed to a direct fusion energy extraction.

Figure 1:
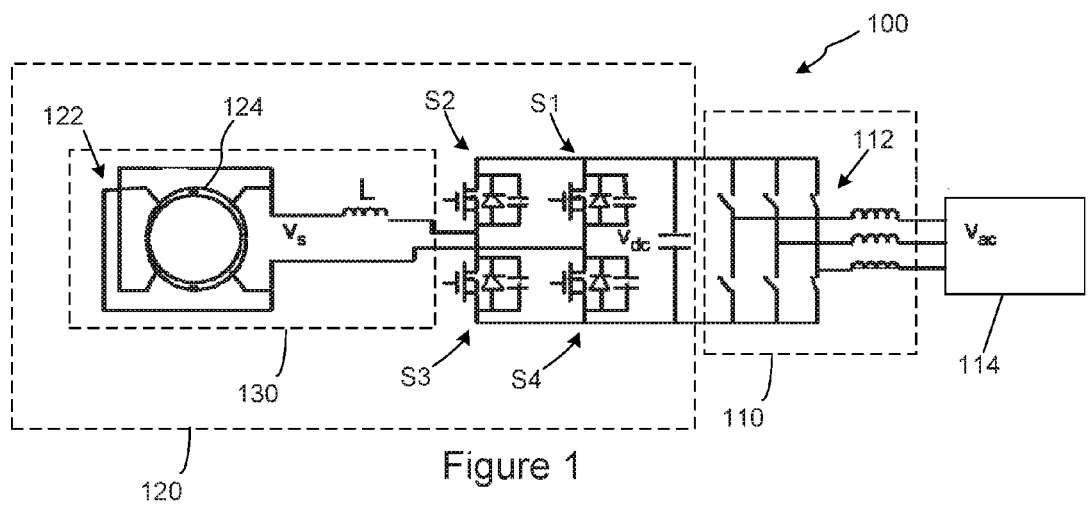
FIG. 1 is a schematic of a fusion energy extraction circuit (FEEC).

FIG. 1 is a block diagram depicting a preferred embodiment of the fusion energy extraction circuit (FEEC) device 100. FEEC device 100 is composed of a grid-tied bidirectional converter component 110 and a resonant converter 120. In a preferred embodiment of the FEEC device 100 in FIG. 1, the bidirectional converter component 110 implements a three-phase grid-tied converter 112. However, it is appreciated that the bidirectional converter component 110 can implement different factor phase grid-tied converters for different purposes. For example, a single-phase grid-tied converter (not shown) can be implemented for lower power applications.

In a preferred embodiment of the FEEC device 100, the resonant converter 120 comprises an inverse cyclotron converter (ICC) 122 and a plurality of switches S1-S4. ICC 122, which is described in greater detail in the '106 patent (which is incorporated herein by reference), is preferably configured with a plurality of plates 124 shown in this instance in a quadrupole configuration. The quadrupole plates 124 of the ICC 122 function as a capacitor and together with an inductor L form a resonant tank 130, which will be described in greater detail below. The plates 124 are preferably elongate with an arcuate cross-section forming an elongate annular cylindrical chamber with axially extending elongate gaps formed between the plates. When current is applied to the plate a multi-pole electric field is formed across the gaps between the plates.

Figure 12:
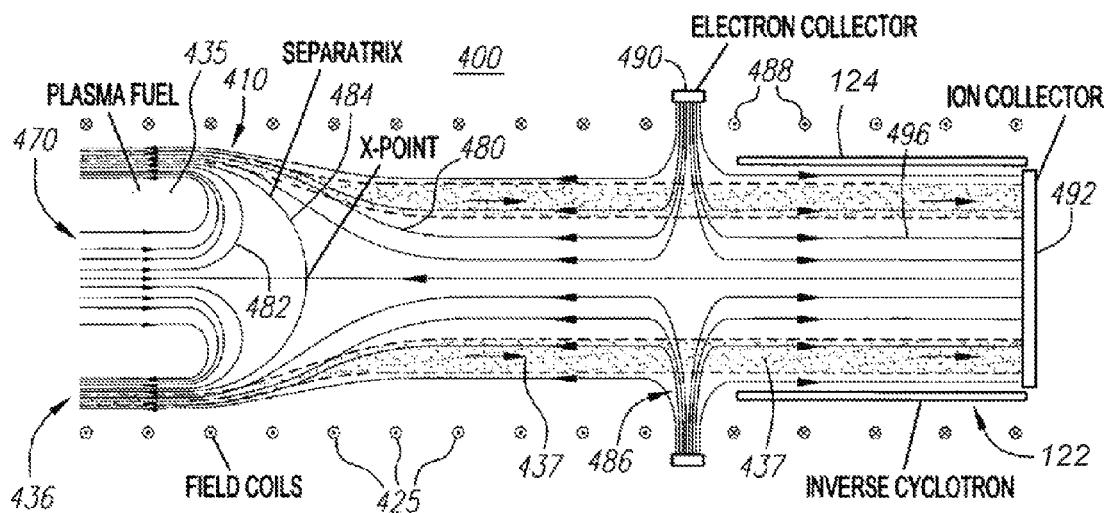
FIG. 12 shows a partial plasma-electric power generation system comprising a colliding beam fusion reactor coupled to an inverse cyclotron direct energy converter.

As described in the '106 patent, a direct energy conversion system comprises an inverse cyclotron converter (ICC) 122 shown in FIG. 12 coupled to a (partially illustrated) power core 436 of a colliding beam fusion reactor (CBFR) 410 to form a plasma-electric power generation system 400. A second ICC (not shown) may be disposed symmetrically to the left of the CBFR 410. A magnetic cusp 486 is located between the CBFR 410 and the ICC 122 and is formed when the CBFR 410 and ICC 122 magnetic fields merge.

The geometry of the ICC 122 is like a hollow cylinder with a length of about five meters. Preferably, four or more equal, semi-cylindrical electrodes 124 with small, straight gaps 497 make up the cylinder surface. In operation, an oscillating potential is applied to the electrodes 124 in an alternating fashion. The electric field E within the converter has a quadrupole structure as indicated in the end view illustrated in FIG. 13. The electric field E vanishes on the symmetry axis and increases linearly with the radius; the peak value is at the gap 497.

In addition, the ICC 122 includes outside field coils 488 to form a uniform field within the ICC's hollow cylinder geometry. Because the current runs through the ICC field coils 488 in a direction opposite to the direction of the current running through the CBFR field coils 425, the field lines 496 in the ICC 122 run in a direction opposite to the direction of the open field lines 480 of the CBFR 410. At an end furthest from the power core 436 of the CBFR 410, the ICC 122 includes an ion collector 492.

In between the CBFR 410 and the ICC 122 is a symmetric magnetic cusp 486 wherein the open field lines 480 of the CBFR 410 merge with the field lines 496 of the ICC 122. An annular shaped electron collector 490 is position about the magnetic cusp 486 and electrically coupled to the ion collector 498. The magnetic field of the magnetic cusps 486 converts the axial velocity of the beam 437 to a rotational velocity with high efficiency.

The CBFR 410 has a cylindrical symmetry. At its center is the fusion power core 436 with a fusion plasma core 435 contained in a FRC 470 magnetic field topology in which the fusion reactions take place. As illustrated, the product nuclei and charge-neutralizing electrons emerge as annular beams 437 from both ends of the fuel plasma 435. The magnetic cusp 486 separates the electrons and ions. The electrons follow the magnetic field lines to the electron collector 490 and the ions pass through the cusp 486 where the ion trajectories are modified to follow a substantially helical path along the length of the ICC 122. Energy is removed from the ions as they spiral past the electrodes 124 connected to a resonant circuit (not shown). The loss of perpendicular energy is greatest for the highest energy ions that initially circulate close to the electrodes 124, where the electric field is strongest.

Figure 13:
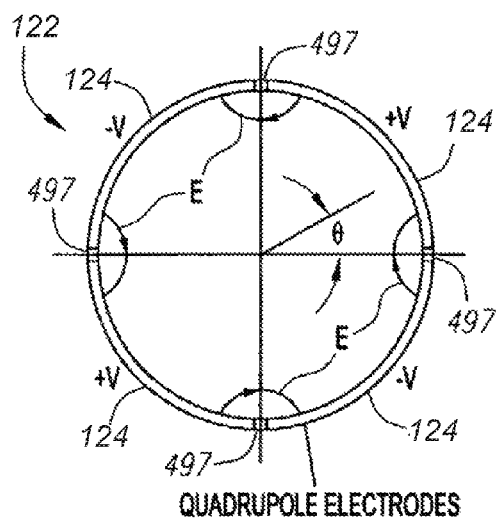
FIG. 13 shows an end view of the inverse cyclotron converter in FIG. 12.

As depicted in FIG. 13, the symmetrical electrode structure of the ICC 122 of the present invention preferably includes four electrodes 124. A tank circuit (not shown) is connected to the electrode structures 124 so that the instantaneous voltages and electric fields are as illustrated. The voltage and the tank circuit oscillate at a frequency of $\omega = \Omega_o$. The azimuthal electric field E at the gaps 497 is illustrated in FIG. 13. In a complete revolution the particle will experience alternately acceleration and deceleration in an order determined by the initial phase. In addition to the azimuthal electric field $E\theta$ there is also a radial electric field Er. The azimuthal field $E\theta$ is maximum in the gaps 497 and decreases as the radius decreases. Because of the gradient in the electric field the deceleration will always dominate over the acceleration. The acceleration phase makes the ion radius increase so that when the ion next encounters a decelerating electric field the ion radius will be larger. The deceleration phase will dominate independent of the initial phase of the ion because the radial gradient of the azimuthal electric field Eθ is always positive.

During device start up, energy flows from the utility grid 114 via the grid-tied bidirectional converter component 110 to the resonant converter 120 to establish the resonance and excite the quadrupole electric field of the resonant converter 120. During power generation/energy extraction, charged particles beams from, such as, e.g., a fusion process, travel through the ICC 122 and decelerated by the quadrupole electric field formed across the gaps between the plates 124 of the ICC 122. Also during generation/extraction, lost energy will be collected by the quadrupole plates 122 in the form of image current $i_s$. The image current $i_s$ will then flow through the resonant converter 120 and the grid-tied bidirectional converter component 110 to the grid 114. The grid-tied converter 110 functions as an ac/dc rectifier during start up time and as a dc/ac grid-tied inverter during generation time. In both cases, the grid-tied converter 110 will operate with unity power factor, leading power factor, or lagging power factor to provide active power and reactive power (VAR) on demand.

In order for the resonant converter 120 to realize electric field excitation and energy extraction, it is preferably that the resonant frequency and voltage be precisely controlled. The frequency in this case is fixed at slightly above the resonant frequency of the resonant tank 130 to ensure zero voltage soft-switching, while the voltage control can be achieved by switching pattern modulation and feedback regulation. Two modulation methods, phase shift modulation (PSM) and pulse-width modulation (PWM) are examined below. Both are capable of the task of voltage control; however, the PSM method yields a wider operation range for dynamic maneuver. Feedback regulation is achieved by comparing the sensed resonant voltage with a reference, while its error is used to modulate the phase or the pulse-width of the switches S1-S4 in the resonant converter 120. With this modulation, automatic bidirectional energy flow according to the operation mode is guaranteed.

Figure 2:
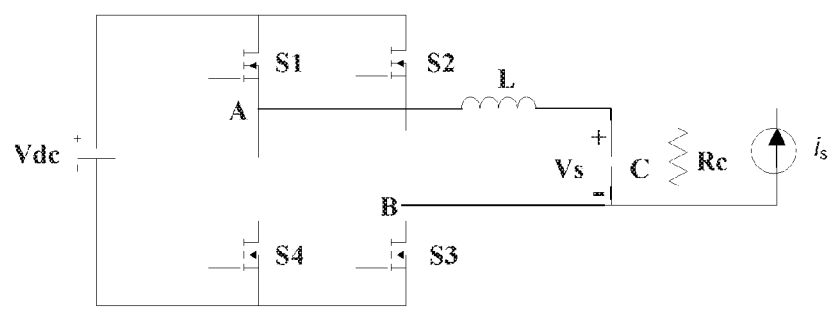
FIG. 2 is a schematic of a resonant converter circuit with equivalent image current source.

FIG. 2 is a schematic diagram depicting an exemplary embodiment of the resonant converter 120, where the dc voltage $v_{dc}$ is provided by the grid-tied bidirectional converter 110 ($v_{dc}$ is also illustrated in FIG. 1). Here, the resonant converter 120 includes a plurality of switches S1, S2, S3, and S4. The switches S1, S2, S3, and S4 form a bridge that chops the dc voltage $v_{dc}$ to a pulse waveform $v_{AB}$ across AB at a switching frequency $f_s$, which is much higher than the frequency of the power grid 114. A capacitor C represents the quadrupole plates 124 of the ICC 122. As indicated above, the capacitor C and the inductor L form the resonant tank 130. Only the fundamental of $v_{AB}$ will pass the resonant tank 130, where it gains H(s), and will appear across the quadrupole plates 122 as a sinusoidal waveform vs. The current source $i_s$ represents the corrected image current when the charged particles are decelerated, and the resistor $R_c$ represents the heat and radiation losses from the charged particles.

The gain H(s) of the resonant tank is:

$$H(s) = \frac{\frac{1}{sC} // R_C}{sL + \frac{1}{sC} // R_C} \quad (1)$$

-continued
$$= \frac{1}{s^2 LC + s\frac{L}{R_C} + 1}$$

Therefore, the magnitude (voltage gain) is:

$$|H(j\omega)| = \frac{1}{\sqrt{(1 - \omega^2 LC)^2 + \left(\frac{\omega L}{R_C}\right)^2}} \quad (2)$$

The maximum amplitude frequency is $\omega_m$ at which frequency the output voltage has the maximum value:

$$\omega_m = \sqrt{\frac{1}{LC} - \frac{1}{2}\left(\frac{1}{CR_C}\right)^2} \quad (3)$$

For the FEEC device 100, $R_C$ is typically very large, thus:

$$\omega_m \approx \omega_r = \frac{1}{\sqrt{LC}} \quad (4)$$

Figure 3:
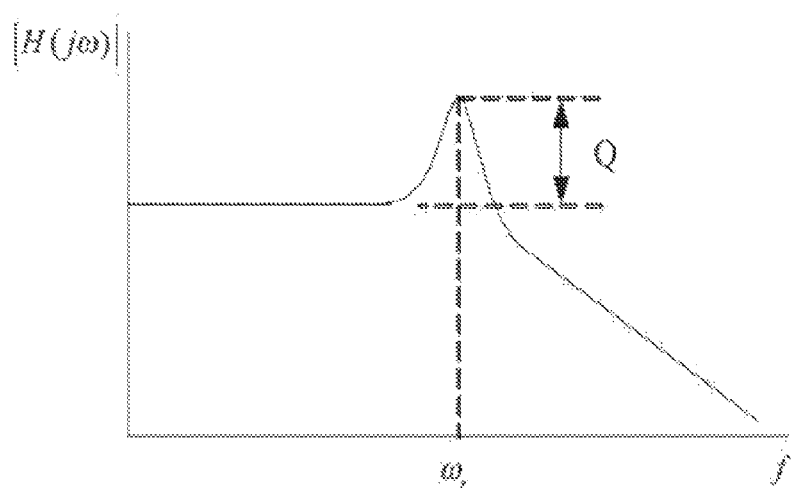
FIG. 3 is a graph showing a Bode plot of the parallel resonant tank.

FIG. 3 illustrates a bode plot of the parallel resonant tank 130. The maximum gain appears approximately at the resonant frequency $\omega_r$. Another important parameter for the resonant circuit is Quality Factor Q:

$$Q = \frac{R_C}{R_0} \quad (5)$$

where $R_0$ is the characteristic impedance of the resonant tank 130:

$$R_0 = \sqrt{\frac{L}{C}} \quad (6)$$

Therefore:

$$Q = \frac{R_C}{\sqrt{\frac{L}{C}}} \quad (7)$$

From equation (7), it is noted that a larger $R_C$ results in a higher Q and a steeper slope of change in voltage gain off the resonance.

As mentioned above, the resonant converter 120 output voltage control can be achieved by switching pattern modulation and feedback regulation. Both phase shift modulation (PSM) and pulse-width modulation (PWM) are capable of the task of voltage control.

Pulse Width Modulation (PWM):

With PWM, the pulse widths of the switches S1, S2, S3, and S4 in the two legs are adjusted. The resulted voltage difference is in a staircase shape whose fundamental component is adjustable by the pulse width.

Figure 4:
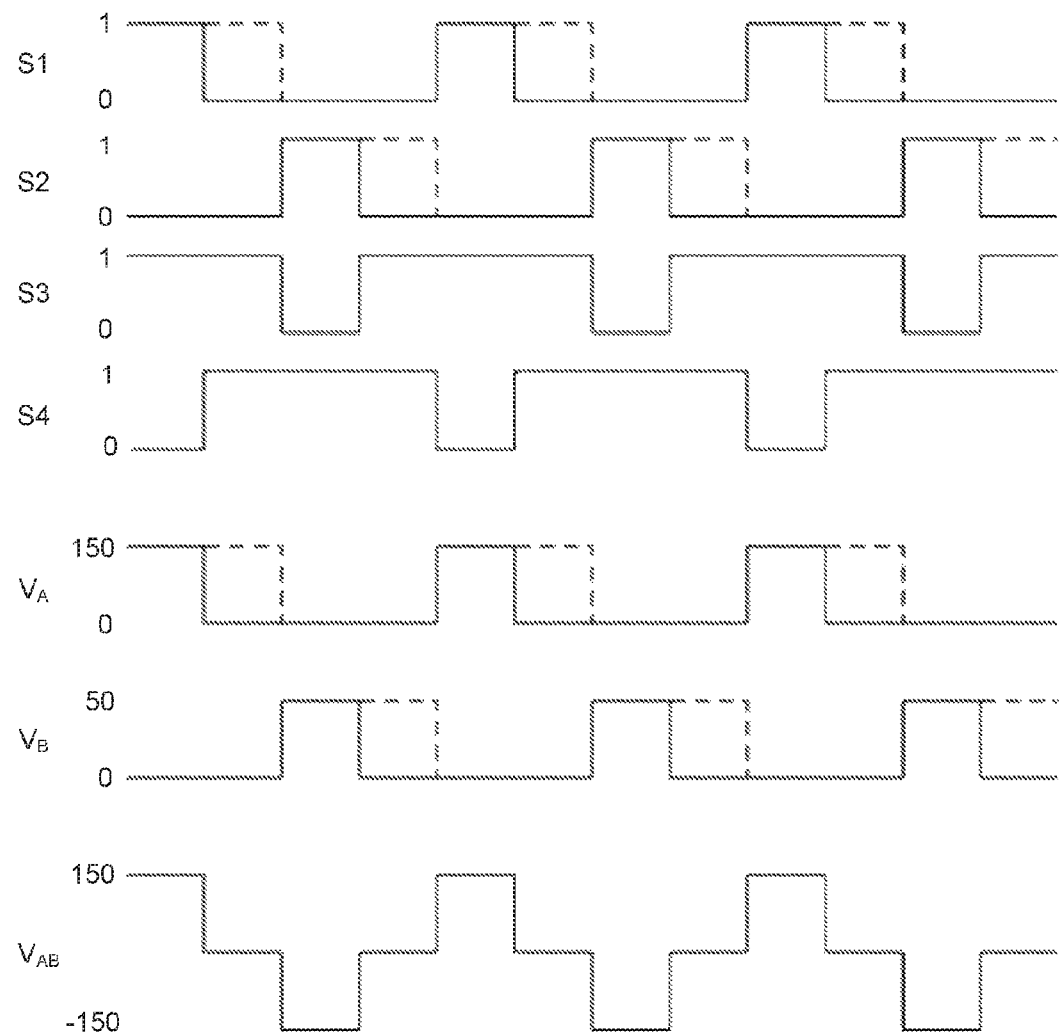
FIG. 4 is a graph showing Pulse Width Modulation method illustration.

FIG. 4 shows the trigger pulse waveform for all the switches S1, S2, S3, and S4 illustrated in FIG. 2. The on time of the switches $S_1$ and $S_2$ is adjusted between 0-50%. The switches $S_4$ and $S_3$ are complementary to the switches $S_1$ and $S_2$ respectively. FIG. 4 also illustrates the voltage pulse waveform at nodes A ($v_A$) and B ($v_B$) of the circuit embodiment illustrated in FIG. 2.

The fundamental of the bridge voltage $v_{AB}$ (as illustrated in FIG. 4) is expressed as follows:

$$V_{ABl} = \frac{600}{\pi} \sin(\pi D) \cos\left(\frac{2\pi}{T_s} t - \pi D\right) \quad D < 0.5$$

The appropriate trigger signals for all switches can be realized by a simple and frequently used circuit.

Figure 5:
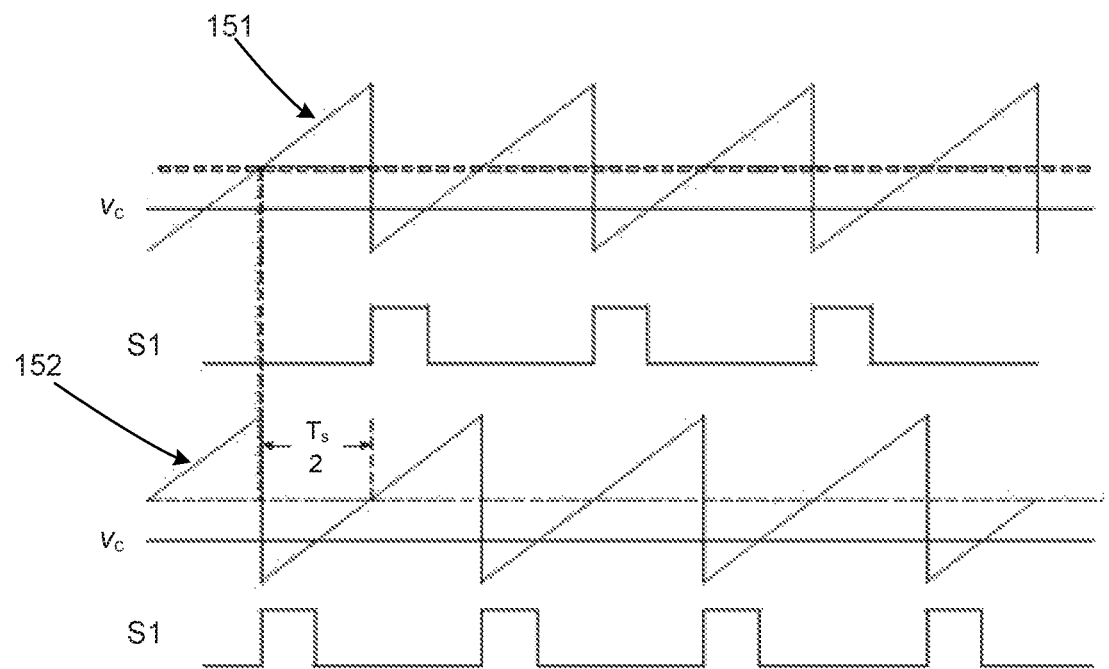
FIG. 5 is a graph showing a mechanism of Pulse Width Modulation generation.

As depicted in FIG. 5, two saw tooth waves 151 and 152, whose phase shift equals $T_s/2$, are compared with the same control signal $V_C$. The duty ratio D equals the portion of time when $V_C$ is greater than the magnitude of the sawtooth. The resulted two pulses are used to trigger the MOSFET switches $S_1$ and $S_2$ respectively. As mentioned above, the switches $S_4$ and $S_3$ are driven by the complementary signals of the switches $S_1$ and $S_2$ respectively. It is noted that the duty ratio D can only be varied between 0-50%. In a preferred embodiment, resonant converter 120 is configured with MOSFET switches S1-S4. It is appreciated that resonant converter 120 can be configured with a variety of circuit switches that would achieve the same result.

Figure 6:
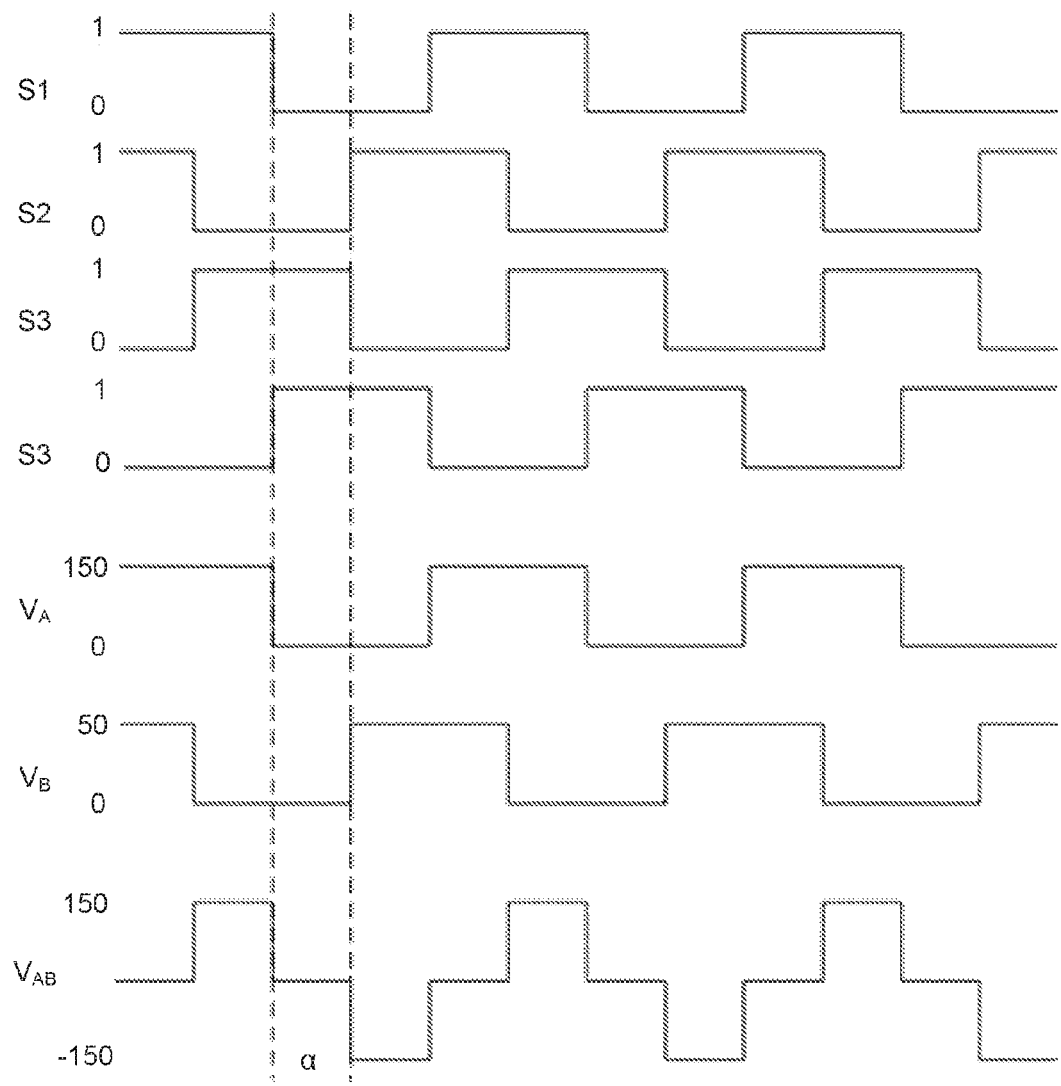
FIG. 6 is a graph providing a Phase Shift Modulation illustration.

Phase Shift Modulation (PSM):

In PSM method, the output voltage of the resonant converter 120 is regulated by adjusting the phase difference between the trigger pulses to the switches of the two legs. FIG. 6 illustrates the typical PSM waveforms of the switch network, where a is the phase shift between leg A and B. Note that the pulse width of the switches does not change. As α changes, the pulse width of the bridge voltage $v_{AB}$ changes. Consequently, the fundamental component changes and the resonate voltage $v_s$ is regulated. The fundamental of the bridge voltage $v_{AB}$ is a function of α:

$$V_{AB} = \frac{600}{\pi} \cos\left(\frac{\alpha}{2}\right) \sin\left(\frac{2\pi}{T_s} t\right) \quad 0 \le \alpha \le \pi$$

It is clear that the phase shift a can control the amplitude of $v_{AB}$.

Figure 7:
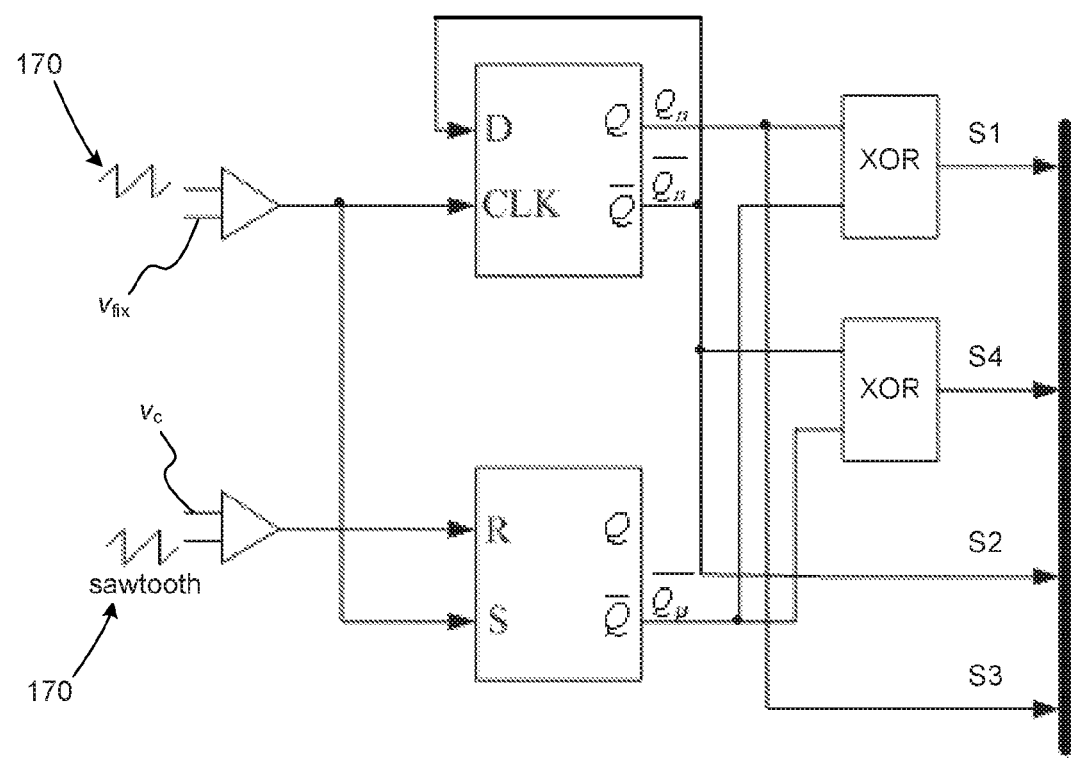
FIG. 7 is a schematic of a Phase Shift Modulation generation circuit.

FIG. 7 illustrates one exemplary embodiment of a circuit capable of implementing an adjustable phase shift between $v_A$ and $v_B$. It is appreciated that many other circuit embodiments can achieve the same goal. For example, various digital circuits can be used for the purpose of implementing an adjustable phase shift. As illustrated in FIG. 7, a saw tooth wave 170 is used as a carrier to compare with two DC voltages—control signal $v_C$ and fixed DC signal $v_{fix}$. When the saw tooth wave 170 is compared with the control signal $v_C$, the comparison results in a phase shift value. When the saw tooth wave 170 is compared with the fixed DC signal $v_{fix}$, the comparison results in a clock signal for all the digital components in the control circuit. The frequency of the saw tooth is twice of the switching frequency which is divided by 2 after passing the D flip-flop.

Resonant Inductor Implementation:

In an alternative embodiment of the FEEC device 100, resonant conductor 120 can implement multiple ferrite inductors connected in series to optimize the FEEC device 100 operation. The series-connected resonant inductors have several advantages over a single resonant inductor. First, the power loss can be reduced because each series-connected inductor can be realized by a small-size, high frequency ferrite core with low core loss and small flux swing. Second, it is possible to make each resonant inductor with a single layer structure, eliminating the need for high voltage isolation between layers. Furthermore, the parasitic capacitance and coupling inductance between layers is also eliminated. These parasitic capacitances and coupling inductances can have a serious effect on the resonant circuit 120 of the FEEC device 100. Third, the single layer structure can provide an effective cooling solution for the resonant inductors without overheating the inner layers. Finally, the series-connected resonant inductors can be implemented by small-size ferrite cores, which are commercially available for high frequency power applications.

Feedback Control Loop:

As mentioned above, the output voltage control of resonant converter 120 can be achieved by switching pattern modulation and feedback regulation. The two modulation methods were described in detail above. Feedback regulation is achieved by comparing the sensed resonant voltage with a reference, while its error is used to modulate the phase or the pulse-width of the switches S1-S4 in the resonant converter 120.

Figure 8:
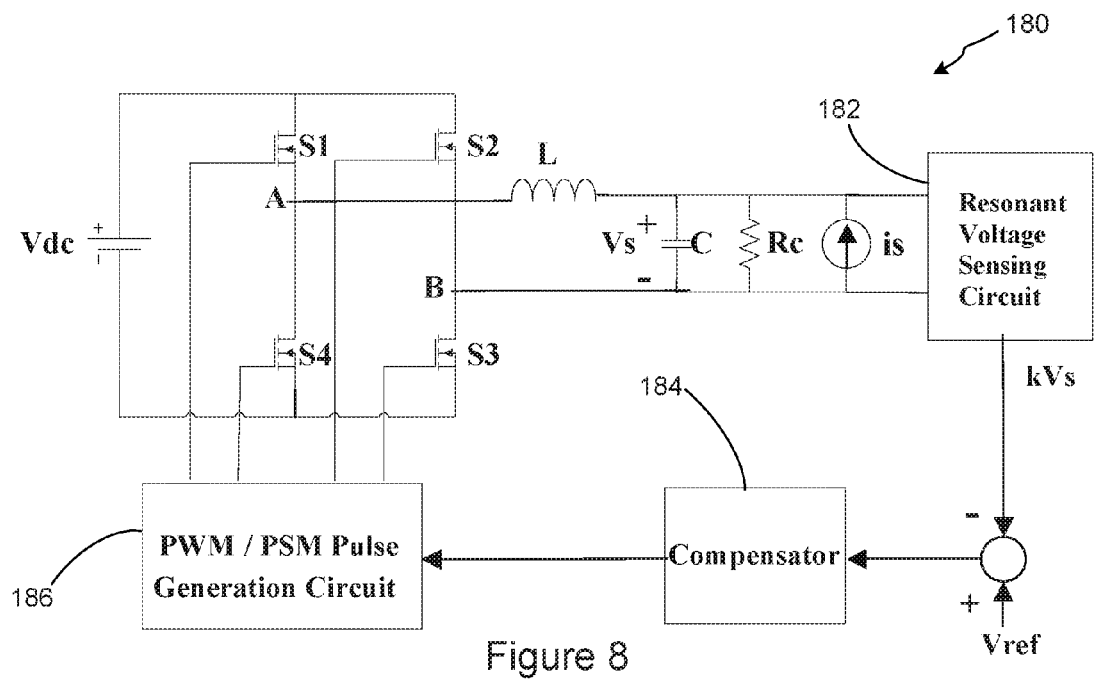
FIG. 8 is a schematic of a feedback loop of the fusion energy extraction circuit.

FIG. 8 illustrates an exemplary embodiment of a feedback control loop 180 of the resonant converter 120. The feedback control loop 180 of the resonant converter 120 is a crucial element of the FEEC device 100 because it facilitates automatic bidirectional power flow. Feedback control loop 180 is composed of a resonant voltage sensing circuit 182, an error compensator 184, and a PWM or PSM pulse generator 186. During the start up mode, the resonant voltage $v_s$ is initially zero. This zero value of the resonant voltage $v_s$ results in a large error and high output from the compensator 184 and the PWM or PSM pulse generator 186 will then produce a high duty ratio or small phase shift, respectively, to ramp up the resonant voltage $v_s$.

During the generation or extraction mode, charged particle beams will travel through the ICC 122 and are decelerated as they rotate through the quadrupole electric field formed across the gaps between the quadrupole plates 124. The lost energy collected at the quadrupole plates 124 will be forced to flow into the resonant converter 120 by the feedback loop 180. Similarly, the feedback loop 180 of the grid-tied bidirectional converter 110 will force the energy collected at the dc bus 181 to flow back to the power grid.

Figure 9:
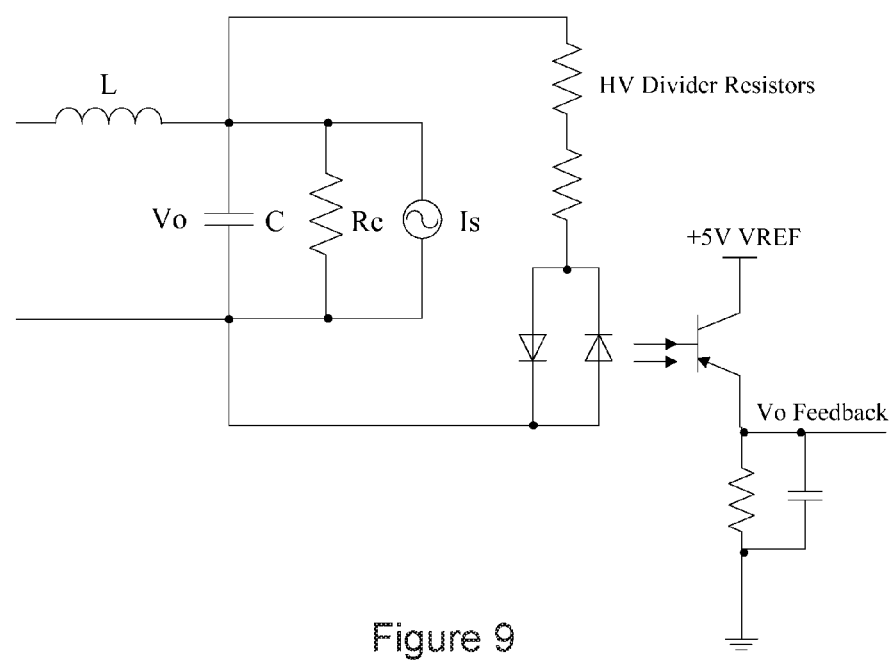
FIG. 9 is a schematic of a resonant voltage sensing circuit.

FIG. 9 illustrates an exemplary embodiment of resonant voltage sensing circuit 182. The input $v_O$ of resonant voltage sensing current is coupled to the resonant output terminal $v_s$, whose resonant voltage modulates the photo diode current. The output of the resonant voltage sensing current ("$v_O$ feedback") is coupled to the error compensator of the PWM or PSM controller with high voltage optic isolation. Therefore, variations in the resonant voltage can be optically transferred as the feedback signal for the control loop 180.

Benefits of this method include low cost, high voltage isolation, and simple implementation. Specifically, the AC input photocoupler with high voltage (HV) divider resistors imposes little effect on the resonant operation since the HV divider resistors have very high resistance.

Figure 10:
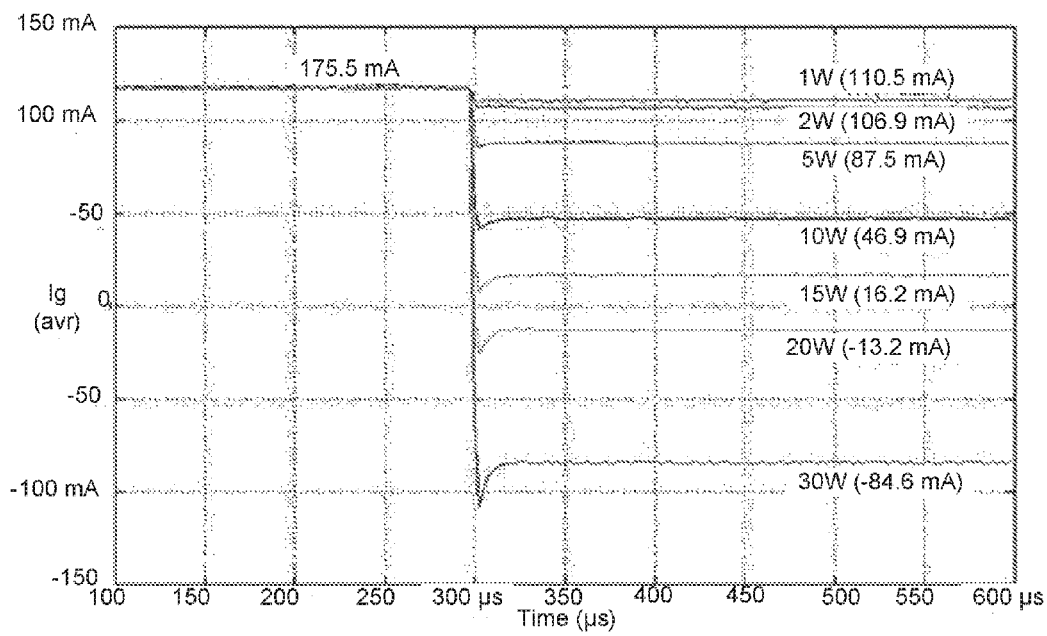
FIG. 10 is a graph depicting a simulation result for the dynamic waveform of the power flow responding to the particle been injection.

Simulation and Experiments:

FIG. 10 illustrates simulation results for various particle strengths. With the FEEC converter device 100, illustrated in FIG. 1, direct fusion energy extraction is demonstrated by the simulation result shown in FIG. 10. The average DC link current $I_{DC}$ values during the start up time and the generation time are illustrated corresponding to the intensity of particle beam injection, which is modeled by the image current source $I_s$. In FIG. 10, charged particles were injected into the ICC 122 at 300 μs. When the charged particles are decelerated by the ICC 122, the fusion energy is approximately proportional to the image current. In this simulation, the heat and radiation losses are modeled by the resistor $R_C$ which is 1 MΩ. During the start up time, the average DC link current $I_{DC}$ value is 117.5 mA that represents the circuit losses. After the image current is injected, $I_{DC}$ value decreases due to the fusion energy input. For example, the DC link current $I_{DC}$ value is reduced to 87.5 mA when a 3 mA image current is injected into the resonant converter 120, which is a 5 W injection case. From FIG. 10, it is expected that when the fusion energy is between 15 W and 20 W, the average DC link current IDC reaches zero (break even) and then is reduced to the negative value (power generation).

The presented FEEC device 100 is capable of providing energy to the quadrupole plates 124 of the ICC 122 to start the deceleration process. When the image current is collected at the quadrupole plates 124, the energy will be sent back to the power grid via the bidirectional grid-tied converter 110.

Figure 11:
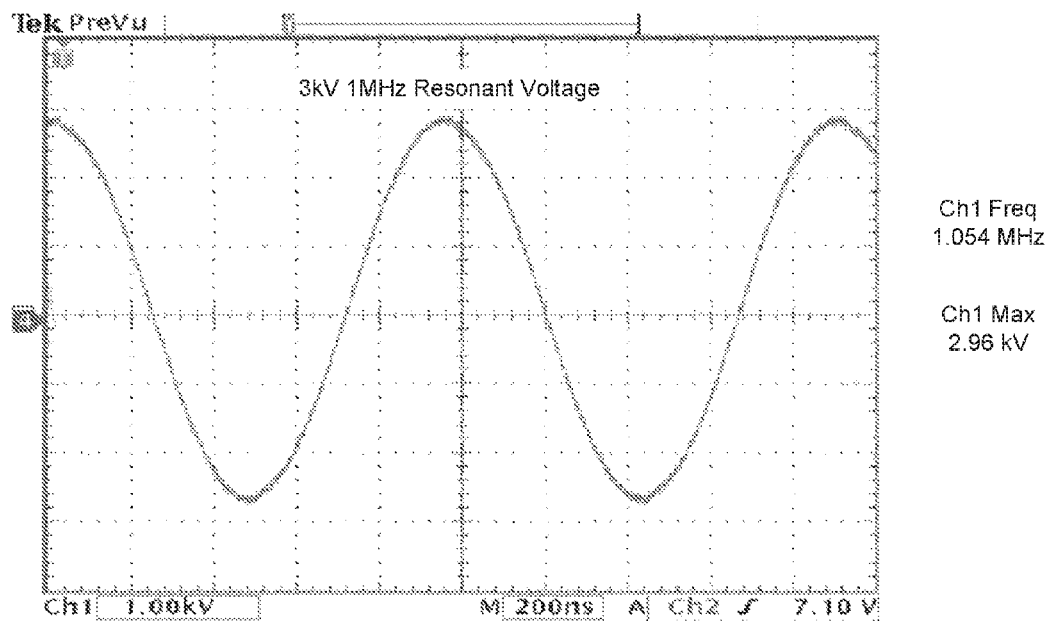
FIG. 11 is a graph depicting experimental results of the resonant voltage at the capacitor (emulating the quadruple plates).

FIG. 11 illustrates an experimental waveform measured across the resonant capacitor C (illustrated in FIG. 2). In this experiment, the resonant inductor L value is about 370 μH and the emulated capacitor value C of the quadrupole plates is 70 pF. The estimated resistor $R_C$ of the heat and radiation losses is 2 MΩ and the frequency of the image current is 1 MHz which is the same as the switching frequency of the resonant converter. With the closed loop control 180, 126V DC link voltage $V_{DC}$ of the resonant converter can generate 3 kV, 1 MHz resonant voltage during the start up time shown in FIG. 11.

The systems and methods provided herein are described for exemplary purposes only with regard to direct fusion energy extraction. However, one skilled in the art would readily appreciate that the systems and methods provided herein for extracting the kinetic energy of charged particles could be used for the recovery of energy in high current ion accelerators. As one of ordinary skill in the art is well aware, high power ion beams from high current ion accelerators are used in various commercial and academic research settings in science and engineering. All these applications are energy intensive. Today most of the energy is simply wasted. The energy extraction process described herein provides a means to recover such energy and reduce the energy consumption of such installations. To achieve this, the extraction design would simply be added at the end of the beam line past the target area.

One skilled in the art would also readily appreciate that the systems and methods provided herein could be used in combination with other systems for the recovery and extraction of energy. PCT Application No. PCT/US2006/008251, entitled "Plasma Electric Generation System," which is incorporated herein by reference, refers to an energy generator system used to provide direct space plasma propulsion. One skilled in the art would readily recognize that the energy extraction process described herein could facilitate energy recovery and extraction from the fusion energy stream when propulsion is not desired.

One skilled in the art would also readily appreciate that the process for extracting the kinetic energy of charged particles could be used for efficiency enhancements in neutral beam accelerators. High power neutral atom beams from positive and/or negative ion sources are used for diagnostics or as energetic atom sources in different commercial and academic settings. In all these applications, the beam sources are characterized by efficiency constraints that arise from the fairly small charge-exchange cross-sections. To achieve pure neutral atom beams, all residual ions past the neutralizing cell are deflected and dumped. This waste energy is usually half of the plug power. Extraction systems of the type described herein can help to recover most of the energy of these "filtered" ions.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. An energy extraction circuit for extracting energy from a charged-particle beam, comprising:
    a bidirectional converter couplable to an electrical power grid; and
    a bidirectional resonant converter comprising a multi-pole inverse cyclotron converter, an inductor electrically coupled to the multi-pole inverse cyclotron converter, and a plurality of circuit switches electrically coupled to the inductor and the multi-pole inverse cyclotron converter and electrically coupled to the bidirectional converter, wherein the multi-pole inverse cyclotron converter combined with the inductor forms a resonant tank, wherein the plurality of circuit switches are configured to form a bridge that chops direct current voltage received from the bidirectional converter to a pulse waveform, wherein the bidirectional converter and the plurality of circuit switches form an ac-to-ac converter between the resonant tank and the electrical power grid.

2. The energy extraction circuit of claim 1 wherein the bidirectional converter is configured to interface a grid ac voltage.

3. The energy extraction circuit of claim 1 wherein the bidirectional converter is configured to function as an ac/dc rectifier during start up mode of operation and as a dc/ac grid-tied inverter during generation mode of operation.

4. The energy extraction circuit of claim 2 wherein the bidirectional converter is controlled to achieve bidirectional power and reactive power flow.

5. The energy extraction circuit of claim 3 wherein the bidirectional converter is configured to operate with at least one of unity power factor, leading phase, or lagging phase.

6. The energy extraction circuit of claim 4 wherein the bidirectional resonant converter is configured by an H-bridge or half-bridge resonant converter.

7. The energy extraction circuit of claim 4 wherein the bidirectional resonant converter is regulated by a feedback control loop having a resonant voltage sensing circuit, a compensator, a modulation generator, and an interface to the resonant converter.

8. The energy extraction circuit of claim 7 wherein the modulation generator is a pulse width modulation generator.

9. The energy extraction circuit of claim 7 wherein the modulation generator is a phase shift modulation generator.

10. The energy extraction circuit of claim 7 wherein the modulation generator adjusts the resonant voltage of the resonant converter.

11. A method for extracting energy from charged particles of charged-particle beams passing through a bidirectional resonant converter in a system comprising a bidirectional resonant converter and a bidirectional converter, comprising the steps of:

receiving electrical energy from a utility grid by a bidirectional converter of the system comprising a resonant converter electrically coupled to a bidirectional converter coupled to the utility grid, wherein the bidirectional resonant converter comprises a multi-pole inverse cyclotron converter, an inductor electrically coupled to the multi-pole inverse cyclotron converter, and a plurality of circuit switches electrically coupled to the inductor and the multi-pole inverse cyclotron converter and electrically coupled to the bidirectional converter, wherein the plurality of circuit switches are configured to form a bridge that chops direct current voltage to a pulse waveform, wherein the bidirectional converter and the plurality of circuit switches form an ac-to-ac converter between the resonant tank and the electrical power grid;

establishing the resonance of the multi-pole inverse cyclotron converter with converted electrical energy received from the bidirectional converter and the plurality of switches; and exciting a multi-pole electric field within the multi-pole inverse cyclotron converter.

12. The method of claim 11 further comprising the steps of:

receiving charged particles in the bidirectional resonant converter;

decelerating the charged particles to extract electric energy from the kinetic energy of the charged particles; and collecting lost energy from decelerating the charged particles in the form of image currents within the multi-pole inverse cyclotron converter.

13. The method of claim 12 further comprising the steps of:

flowing image currents through the bidirectional resonant converter; and flowing image currents back to the utility grid through the grid-tied converter.

14. The method of claim 12 further comprising the steps of sending the extracted electric energy back to the utility grid.

* * * * *